June 28, 1966  J. P. WARD  3,258,680
VOLTAGE REGULATOR-LIMITER
Filed June 22, 1962

INVENTOR.
JOHN P. WARD

ATTORNEYS

3,258,680
VOLTAGE REGULATOR-LIMITER
John P. Ward, San Diego, Calif.
(4652 Denwood Road, La Mesa, Calif.)
Filed June 22, 1962, Ser. No. 204,655
1 Claim. (Cl. 323—22)

The invention described herein may be manufactured and used by or for the Government of the United States of America for governmental purposes without the payment of any royalties thereon or therefor.

The present invention relates to a voltage regulator for producing a regulated voltage across a load circuit and, more particularly, to such a voltage regulator employing a voltage limiting circuit to protect the load circuit from overvoltage.

Briefly, the present device expands upon the prior art voltage regulators, which compare a portion of the output voltage across the load circuit with a reference voltage to derive a control signal and then amplify this control signal to an appropriate level for suitably controlling a variable impedance between a voltage source and the given load circuit, by providing such a voltage regulator with a circuit which adds a load protection feature to the normal voltage regulation feature. This load protection circuit protects the load circuit from overvoltage such as could occur, for example, in a normal voltage regulator when either some component in the control amplifier fails or the voltage reference tube fails or when one of the tubes in the control amplifier or the voltage reference tube is inadvertently removed from its socket. This protection of the load circuit from possible overvoltage is here effectuated by limiting the possible rise in voltage of the amplified control signal to a certain predetermined value which will prevent the variable impedance from going below a certain "safe" level which, in turn, will limit the output voltage across the load circuit to a reasonable and safe value. A particularly significant feature of the load "protection" feature of the present voltage regulator-limiter is the fact that during normal operation of the voltage regulating portion of the device (when the voltage limiting portion of the device has not been brought into play) the voltage limiting portion of the device does not cause any significant degradation of the output voltage regulation.

An object of the present invention is to provide a device to limit the output voltage rise of a regulated power supply when there is a failure within said voltage-regulated power supply.

Another object is to provide a voltage regulator which incorporates a safety feature to protect the load circuit associated therewith from possible overvoltage.

Other objects and many of the attendant advantages of this invention will be readily appreciated as the same becomes better understood by reference to the following detailed description when considered in conjunction with the accompanying drawing wherein.

Figure 1:
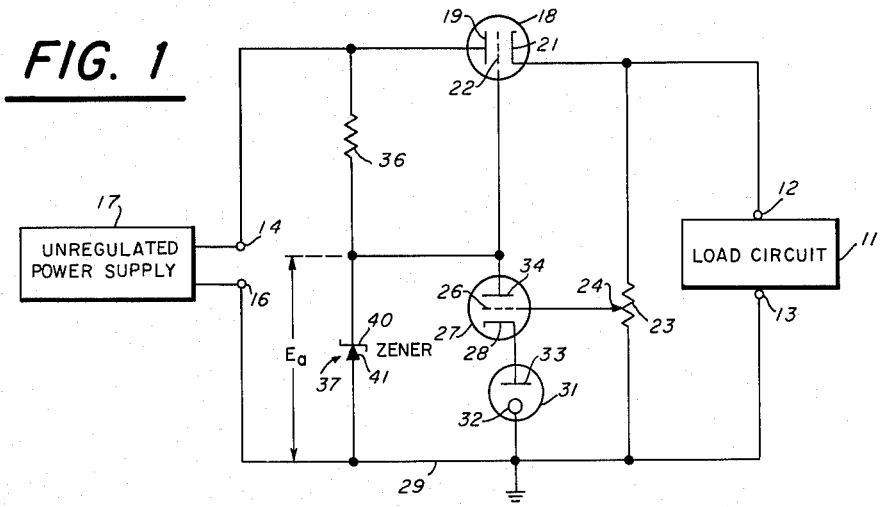
FIG. 1 shows an illustrative embodiment of the present invention.

Referring now to FIG. 1 there is shown an output or load circuit 11 having input terminals 12 and 13, respectively, which are linked by a circuit later to be described to respective output terminals 14 and 16 of a source of unregulated unidirectional voltage 17.

This circuit linking the unregulated power supply 17 with load circuit 11 includes a variable impedance 18 in series with load circuit 11 and located between the power supply output terminal 14 and the load circuit input terminal 12. Here the variable impedance 18 is shown as a series regulator tube having a plate 19, a cathode 21 and a grid 22. Connected in parallel across load circuit 11 is a load-sensing resistor 23. A movable tap 24, selectively movable along load-sensing resistor 23, allows a portion of the voltage developed across the load circuit 11 to be conveyed to the grid 26 of amplifier tube 27. The cathode 28 of this amplifier tube 27 is connected to lead 29, which interconnects power supply output terminal 16 and load circuit input terminal 13, via a constant voltage reference tube 31 which can be a cold cathode discharge tube or any like constant voltage reference element. This constant voltage reference tube 31 which has a cathode 32 and a plate 33 may have its cathode grounded as shown in FIG. 1. The plate 34 of amplifier tube 27 is connected to the grid 22 of the series voltage regulator tube 18 and is also connected to the plate 19 of this voltage regulator tube 18 via resistor 36 and to lead 29, which interconnects terminals 16 and 13, via Zener diode 37 which is poled as shown in FIG. 1 with its cathode 40 connected to plate 34 of amplifier tube 27 and its anode 41 connected to lead 29.

The operation of this circuit interconnecting the unregulated power supply 17 and load circuit 11 can be explained thusly. For the purpose of maintaining a substantially constant voltage across the input terminals 12 and 13 of load circuit 11 a voltage regulating function is accomplished by appropriately varying the impedance of voltage regulator tube 18. By means of movable tap 24 a portion of the voltage developed across load-sensing resistor 23 is sensed and fed to the grid 26 of amplifier tube 27. This amplifier tube 27 and the constant reference tube 31 comprise a combination comparator-and-amplifier unit. The voltage signal selected by movable tap 24 is compared in amplitude with the fixed reference voltage on the cathode 28 of amplifier tube 27. When this tapped-off signal differs in voltage amplitude from the fixed reference voltage a control signal proportional to the difference in amplitude between the compared voltages is amplified by amplifier tube 27 and passed on to the grid 22 of voltage regulator tube 18 where this amplified control signal, by appropriately changing the bias on the grid of regulator tube 18, shifts the impedance of the tube 18 in such direction as to keep the voltage impressed across the load circuit 11 substantially constant. Thus any incremental shift in the voltage across load circuit terminals 12 and 13 is impressed on the grid 26 of amplifier tube 27 via movable tap 24 to produce an output signal from amplifier tube 27 which will alter the bias on grid 22 of voltage regulator tube 18 in a manner to minimize the change in the output voltage appearing across load circuit terminals 12 and 13. For example, if the voltage across the load circuit 11 incrementally increases the tapped-off voltage on grid 26 will correspondingly increase, causing amplifier tube 27 to become more conductive and the voltage on grid 22 (of voltage regulator tube 18) to go more negative. With this bias on grid 22 going more negative the effective impedance of voltage regulator tube 18 is thereby increased to cause a corresponding decrease in voltage across load circuit 11, bringing the voltage across the load circuit back to its normal operating level. If the incremental change of voltage across load circuit 11 is in the direction to decrease the voltage from the desired operating level, the tapped-off voltage on grid 26 decreases, causing amplifier tube 27 to become less conductive and the voltage on grid 22 (of voltage regulator tube 18) to go more positive. With this bias on grid 22 going more positive the effective impedance of voltage regulator tube 18 is thereby decreased to cause a corresponding increase in voltage across load circuit 11, to bring the voltage across the load circuit back to its normal operating level. Thus is described the voltage regulating function of the interlinking circuit whereby the variable impedance of voltage regulator tube 18 is made responsive to variations in the voltage developed across resistor 23 to keep the voltage developed across this resistor 23 and thus across the load circuit 11 constant.

The Zener diode 37, which may be suitably replaced by a series string of Zener diodes, provides a protective function to the load circuit in that it protects the load circuit from overvoltage such as might be occasioned, for example, by the failure of some component of the control amplifier or if the reference tube 31 should be inadvertently removed from its socket. This Zener diode 37 (or equivalent string of Zener diodes) is chosen for a Zener break-down voltage which will be the voltage $E_a$ as shown in FIG. 1 plus a predetermined amount greater than $E_a$. For purposes of explanation this Zener voltage will hereinafter be designated $E_a'$. When the regulated voltage supply to the load circuit 11 is in normal operation this Zener diode 37 will be in the high resistance region of back bias and will present essentially no load to the control amplifier because of this extremely high back resistance; accordingly, the Zener diode 37 will not in any significant amount degrade the output voltage regulation. With a failure in either control amplifier tube 27 or of constant reference voltage tube 31, or in the event of some like circumstance, the voltage across Zener diode 37 can only increase from $E_a$ to $E_a'$. When this voltage $E_a'$ is reached, the Zener diode 37 will "break down" and dramatically increase the effective impedance between terminals 14 and 12 to prevent the load circuit 11 from being subjected to overvoltage because of such an incident such as failure of one of the named components, as hereinbefore noted. Thus the output rise in voltage due to one of the above-enumerated circumstances or to any other like cause can be limited to approximately the same percentage as that by which $E_a'$ exceeds $E_a$. Of signal importance is the fact that the use of the Zener diode with its very high resistance in the back bias region at voltages less than Zener voltage, thus essentially causing no load to be presented by it to the control amplifier, allows this protective feature to be incorporated into the normal voltage regulating circuit without causing the output voltage regulation to suffer any significant degradation.

Figure 2:
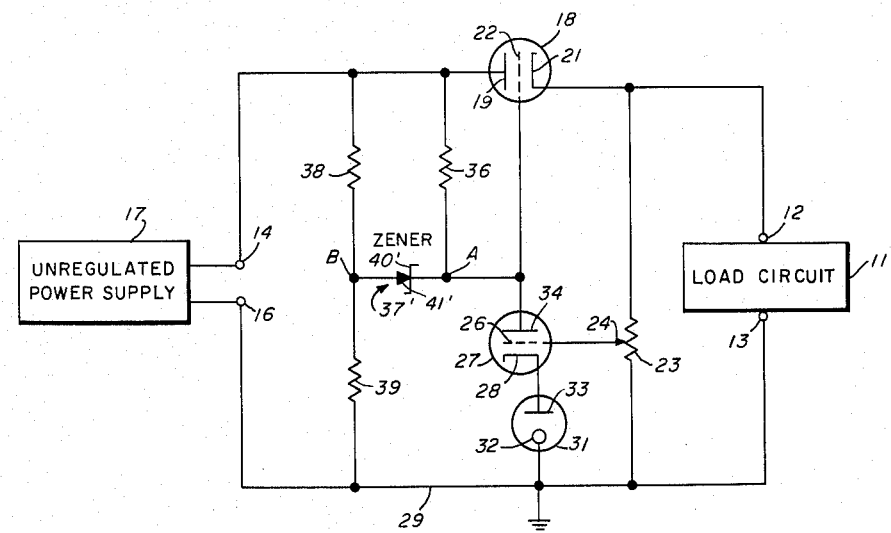
FIG. 2 shows a modified embodiment thereof.

FIG. 2 portrays an alternative circuit for accomplishing the voltage limiting function. Herein the Zener diode 37' is referenced to the voltage at point "B" (intermediate resistors 38 and 39) rather than ground. Because the currently generally-available Zener diodes are limited in their maximum voltages, i.e., most commercially available Zener diodes will "break down" at around 200 volts, for certain applications the Zener diode placement portrayed by the FIG. 2 embodiment may be more appropriate. The other recourse in a situation where high voltages are to be encountered is to use a series string of Zener diodes, as previously mentioned.

Obviously many modifications and variations of the present invention are possible in the light of the above teachings. It is intended to cover all changes and modifications of the embodiments set forth herein which do not constitute departures from the spirit and scope of the invention.

What is claimed is:

A voltage regulator-limiter for connecting a source potential having a first output and second output terminal to a load having a first input and second input terminal comprising:
  connecting means for connecting said second output terminal to said second input terminal,
  a regulator circuit including,
  a variable impedance having a plate, cathode, and grid, said plate being connected to said first output terminal and said cathode being connected to said first input terminal,
  a load sensing resistor connected in parallel with said load and having a means for developing an output signal which is a function of the load,
  an amplifier tube having a plate, cathode, and grid, the amplifier tube grid being connected to the developing means and the amplifier tube plate being connected to the variable impedance grid,
  a constant voltage tube having a plate and cathode, the voltage tube plate being connected to the amplifier tube cathtode and the voltage tube cathode being connected to said connecting means, and
  a resistor connected from said first output terminal to said amplifier tube plate;
  a limiter circuit including
  a Zener diode having a break down potential substantially equal to said source potential and being connected in parallel across said amplifier tube and said reference tube, said diode being non-conducting when said load potential is regulated by said regulator circuit and being conducting only when said regulator circuit fails.

References Cited by the Examiner
UNITED STATES PATENTS

| | | | |
|---|---|---|---|
| 2,579,816 | 12/1951 | Gluyas | 323—22 |
| 2,832,900 | 4/1958 | Ford | 323—22 |
| 2,997,643 | 8/1961 | Schlansker | 323—22 |
| 3,201,682 | 8/1965 | Johnson | 323—22 |

FOREIGN PATENTS 594,732  11/1947  Great Britain.

LLOYD McCOLLUM, *Primary Examiner.*

K. HADLAND, K. D. MOORE, *Assistant Examiners.*